US008493502B2

(12) United States Patent
Manabe (10) Patent No.: US 8,493,502 B2
(45) Date of Patent: Jul. 23, 2013

(54) IMAGE PICKUP APPARATUS, IMAGE PICKUP METHOD, AND STORAGE MEDIUM STORING PROGRAM

(75) Inventor: Yoshitsugu Manabe, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 164 days.

(21) Appl. No.: 13/209,546

(22) Filed: Aug. 15, 2011

(65) Prior Publication Data
US 2012/0044379 A1 Feb. 23, 2012

(30) Foreign Application Priority Data
Aug. 18, 2010 (JP) ................................. 2010-182678

(51) Int. Cl.
*H04N 5/225* (2006.01)
*H04N 5/222* (2006.01)
*G03B 15/03* (2006.01)
*G06K 9/40* (2006.01)

(52) U.S. Cl.
USPC ......... 348/371; 348/216.1; 396/165; 382/274

(58) Field of Classification Search
USPC ............ 348/216.1, 218.1, 370, 371; 396/165; 382/274
See application file for complete search history.

(56) References Cited

U.S. PATENT DOCUMENTS

| 5,606,630 | A | 2/1997 | Maeda et al. |
| 5,974,190 | A | 10/1999 | Maeda et al. |
| 6,654,062 | B1 * | 11/2003 | Numata et al. ................ 348/362 |
| 7,057,650 | B1 | 6/2006 | Sakamoto |
| 7,352,393 | B2 | 4/2008 | Sakamoto |
| 7,443,443 | B2 * | 10/2008 | Raskar et al. ................ 348/370 |
| 7,583,297 | B2 * | 9/2009 | Yamada ..................... 348/224.1 |
| 7,619,664 | B2 * | 11/2009 | Pollard et al. ................ 348/241 |
| 8,248,485 | B2 * | 8/2012 | Ishii et al. ................. 348/222.1 |
| 2002/0113882 | A1 * | 8/2002 | Pollard et al. ................ 348/239 |
| 2004/0238718 | A1 * | 12/2004 | Washisu ..................... 250/201.2 |
| 2005/0094895 | A1 * | 5/2005 | Baron ........................ 382/275 |
| 2006/0132642 | A1 * | 6/2006 | Hosaka et al. ................ 348/370 |

(Continued)

FOREIGN PATENT DOCUMENTS

| JP | 6-253147 A | 9/1994 |
| JP | 2002-044516 A | 2/2002 |

(Continued)

OTHER PUBLICATIONS

Japanese Office Action dated Jul. 31, 2012 (and English translation thereof) in counterpart Japanese Application No. 2010-182678.

*Primary Examiner* — John Villecco
(74) *Attorney, Agent, or Firm* — Holtz, Holtz, Goodman & Chick, P.C.

(57) ABSTRACT

An image pickup apparatus includes an image pickup unit, a light emission unit, an image acquisition unit configured to drive the image pickup unit and the light emission unit to acquire an image while the light emission unit is emitting light and acquire images while the light emission unit is emitting no light at substantially the same view angle, a difference acquisition unit configured to acquire a luminance difference between the image acquired while the light emission unit is emitting light and one of the images acquired while the light emission unit is emitting no light, and an image composing unit configured to compose a composite image from the images acquired while the light emission unit is emitting no light and the image acquired while the light emission unit is emitting light, using the luminance difference acquired by the difference acquisition unit as transmission intensity data.

5 Claims, 5 Drawing Sheets

U.S. PATENT DOCUMENTS

| | | | |
|---|---|---|---|
| 2007/0201853 A1* | 8/2007 | Petschnigg | 396/155 |
| 2009/0303343 A1* | 12/2009 | Drimbarean et al. | 348/222.1 |
| 2010/0149371 A1* | 6/2010 | Steinberg et al. | 348/222.1 |
| 2010/0157085 A1* | 6/2010 | Sasaki | 348/222.1 |
| 2010/0238320 A1* | 9/2010 | Washisu | 348/229.1 |
| 2012/0008015 A1* | 1/2012 | Manabe | 348/234 |
| 2012/0019686 A1* | 1/2012 | Manabe | 348/222.1 |
| 2012/0020556 A1* | 1/2012 | Manabe | 382/167 |
| 2012/0133797 A1* | 5/2012 | Sato et al. | 348/239 |
| 2012/0177352 A1* | 7/2012 | Pillman et al. | 396/61 |

FOREIGN PATENT DOCUMENTS

| | | | |
|---|---|---|---|
| JP | 2003087645 A | * | 3/2003 |
| JP | 2005-86488 A | | 3/2005 |
| JP | 2007288235 A | * | 11/2007 |
| JP | 2008-022321 A | | 1/2008 |
| WO | WO 99/67949 A1 | | 12/1999 |

* cited by examiner

IMAGE PICKUP APPARATUS, IMAGE PICKUP METHOD, AND STORAGE MEDIUM STORING PROGRAM

CROSS-REFERENCE TO RELATED APPLICATIONS

This application is based upon and claims the benefit of priority from prior Japanese Patent Application No. 2010-182678, filed Aug. 18, 2010, the entire contents of which are incorporated herein by reference.

BACKGROUND OF THE INVENTION

1. Field of the Invention

The present invention relates to an image pickup apparatus having a continuous shooting function, a image pickup method, and a storage medium storing a program.

2. Description of the Related Art

A technique of photography a person on the background of a night view has been proposed, which provides an image in which both the person and the night view look conspicuous.

Jpn. Pat. Appln. KOKAI Publication No. 2005-086488, for example, discloses such a technique. In this technique, a flash-on photography and a flash-off photography are continuously performed.

The image acquired in the flash-off photography and the image acquired in the flash-off photography are processed to compose a composite image in which both the main object and the night view are appropriately lighted and therefore look conspicuous.

In this technique, a high photographic sensitivity is set in the flash-off photographic mode so that the night view may be appropriately exposed. As a result, thermal noise will remain in the image.

The image composition may solve the noise-related problem in the region having the person's image. In the other region of the image, however, the thermal noise remains. The thermal noise inevitably results in the recording of a low-quality image.

BRIEF SUMMARY OF THE INVENTION

Accordingly, it is an object of the present invention to provide a technique, which can obtain a high-quality image in which both the main object and the night view look conspicuous, even if the image is photographed in a relatively dark place.

According to one aspect of the present invention, there is provided an image pickup apparatus comprising: an image pickup unit; a light emission unit; an image acquisition unit configured to drive the image pickup unit and the light emission unit to acquire an image while the light emission unit is emitting light and acquire images while the light emission unit is emitting no light at substantially the same view angle; a difference acquisition unit configured to acquire a luminance difference between the image acquired while the light emission unit is emitting light and one of the images acquired while the light emission unit is emitting no light; and an image composing unit configured to compose a composite image from the images acquired while the light emission unit is emitting no light and the image acquired while the light emission unit is emitting light, using the luminance difference acquired by the difference acquisition unit as transmission intensity data.

According to another aspect of the present invention, there is provided a image pickup method comprising: driving an image pickup unit and a light emission unit to acquire an image while the light emission unit is emitting light and acquire images while the light emission unit is emitting no light at substantially the same view angle; acquiring a luminance difference between the image acquired while the light emission unit is emitting light and one of the images acquired while the light emission unit is emitting no light; and composing a composite image from the images acquired while the light emission unit is emitting no light and the image acquired while the light emission unit is emitting light, using the luminance difference acquired by the difference acquisition unit as transmission intensity data.

According to still another aspect of the present invention, there is provided a non-transitory computer-readable storage medium having program code stored thereon for controlling a computer as an image pickup apparatus that includes an image pickup unit and a light emission unit, the program code comprising: driving the image pickup unit and the light emission unit to acquire an image while the light emission unit is emitting light and acquire images while the light emission unit is emitting no light at substantially the same view angle; acquiring a luminance difference between the image acquired while the light emission unit is emitting light and one of the images acquired while the light emission unit is emitting no light; and composing a composite image from the images acquired while the light emission unit is emitting no light and the image acquired while the light emission unit is emitting light, using the luminance difference acquired by the difference acquisition unit as transmission intensity data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the accompanying drawings.

Figure 1:
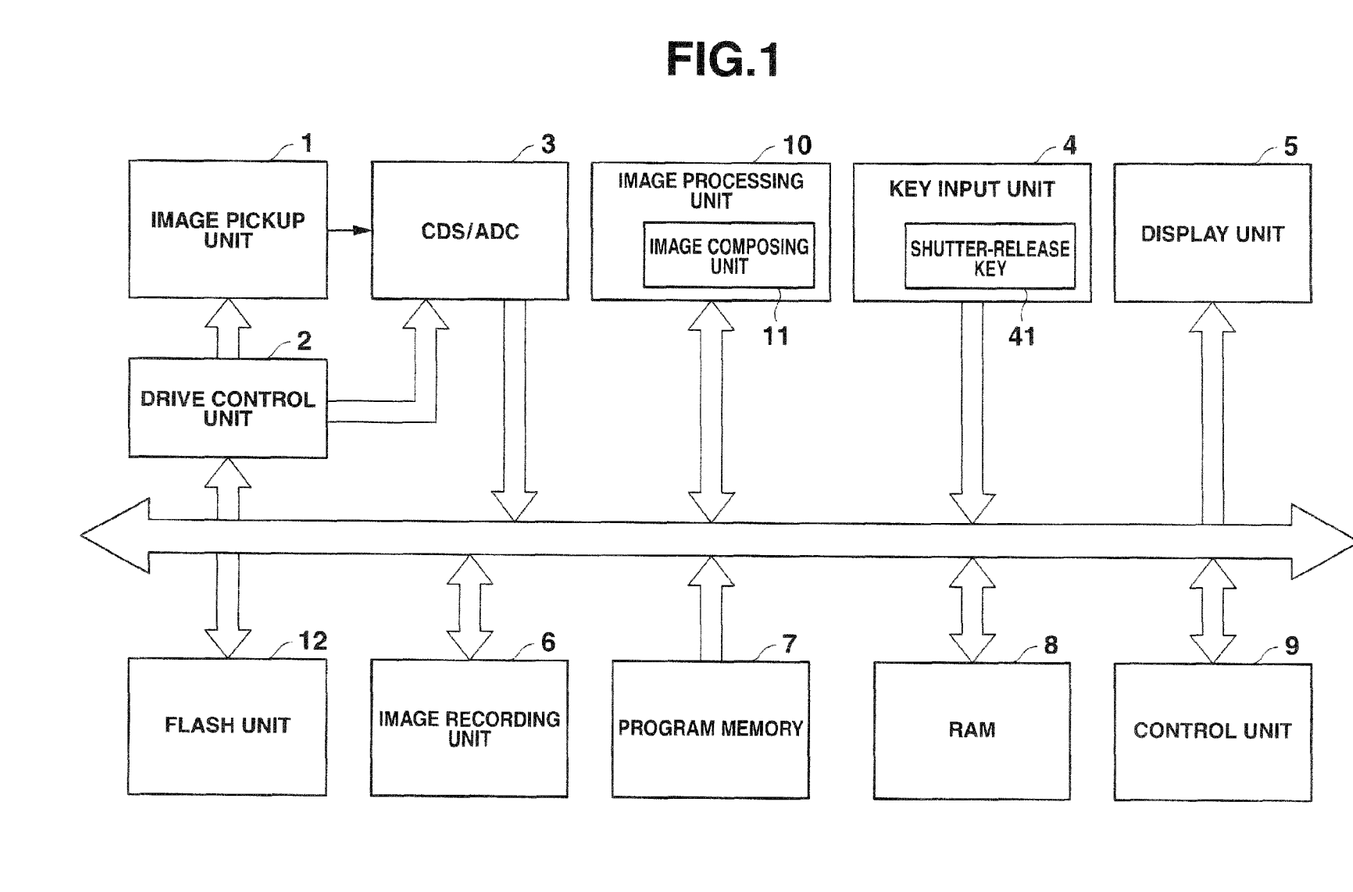
FIG. 1 is a circuit block diagram of an image pickup apparatus according to an embodiment of the present invention.

FIG. 1 is a circuit block diagram of an image pickup apparatus according to the embodiment of the invention, which has an image processing device.

The image pickup apparatus includes an image pickup unit 1, a drive control unit 2, a CDS/ADC 3, a key input unit 4, a display unit 5, an image recording unit 6, a program memory 7, a RAM 8, a control unit 9, an image processing unit 10, and a flash unit 12.

These components are connected by a bus line.

The key input unit 4 includes a shutter-release key 41 configured to detect the photographer's record instructions, if any. The image processing unit 10 includes an image composing unit 11.

The image pickup unit 1 incorporates an image sensor such as CMOS, an RGB color filter provided on the image sensor, and a driver. The driver holds an electric charge equivalent to light intensity for a prescribed time and outputs the charge as an analog image signal to the CDS/ADC 3, under the control of the drive control unit 2. The image pickup unit 1 acquires a plurality of images (color images) upon detecting a photographic command generated as the shutter-release key 41 is pushed and supplied though the control unit 9 and the drive control unit 2.

The CDS/ADC 3 is a circuit that receives the analog image signal output from the image pickup unit 1 and representing an optical image of an object. The CDS/ADC 3 includes a CDS configured to hold the image signal input, a gain adjusting amplifier (AGC) configured to amplify the image signal, and an analog-to-digital converter (ADC) configured to convert the amplified image signal to a digital image signal.

Note that the gain adjusting amplifier is controlled in accordance with the instructions coming from the drive control unit 2.

Hence, images of various conditions can be generated by changing the RGB gain and the image colors even if the exposure conditions (i.e., shutter-release speed or the diaphragm opening) remain unchanged.

In this embodiment, the drive control unit 2 controls the gain adjusting amplifier. Instead, the control unit 9 may control the gain adjusting amplifier.

The key input unit 4 has various keys, including the shutter-release key 41 mentioned above. These keys may be operated to switch the apparatus to the photographic mode to acquire and record images and to switch the display mode.

The shutter-release key 41 is a button switch having two operating strokes, i.e., first, stroke (half depression) and second stroke (full depression).

The display unit 5 has a function of displaying composite images.

The image recording unit 6 is configured to record or store any JPEG-encoded image data (image file) generate after execution of the image composition according to the embodiment.

The program memory 7 stores the programs the control unit 9 and image processing unit 10 may execute. The control unit 9 reads, as needed, these programs from the program memory 7.

The RAM 8 has the function of temporarily holding the data generated in each process performed in the image pickup apparatus.

The control unit 9 controls the other components of the image pickup apparatus. The flash unit 12 emits auxiliary photographic light at the timing controlled by the drive control unit 2.

The image processing unit 10, which is configured to encode and decode image data, has the image composing unit 11. The image composing unit 11 is a component characterizing the present embodiment.

The image composing unit 11 executes an image composition (arithmetic addition) process and the like on a flash-on image and flash-off images the image pickup unit 1 has acquired by using and not using the flash unit 12, respectively, to generate the composite image in which both the main object and the night view look conspicuous, using a flash determination map (described later) as a transmission intensity map ($\alpha$ map) about the composite image.

How the embodiment operates will be explained. Assume the user pushes the mode button of the key input unit 4, setting "night view/person mode," which is one of the photographic modes available. The control unit 9 then reads the program from the program memory 7 and starts operating as will be explained with reference to the flowchart of FIG. 2.

Figure 2:
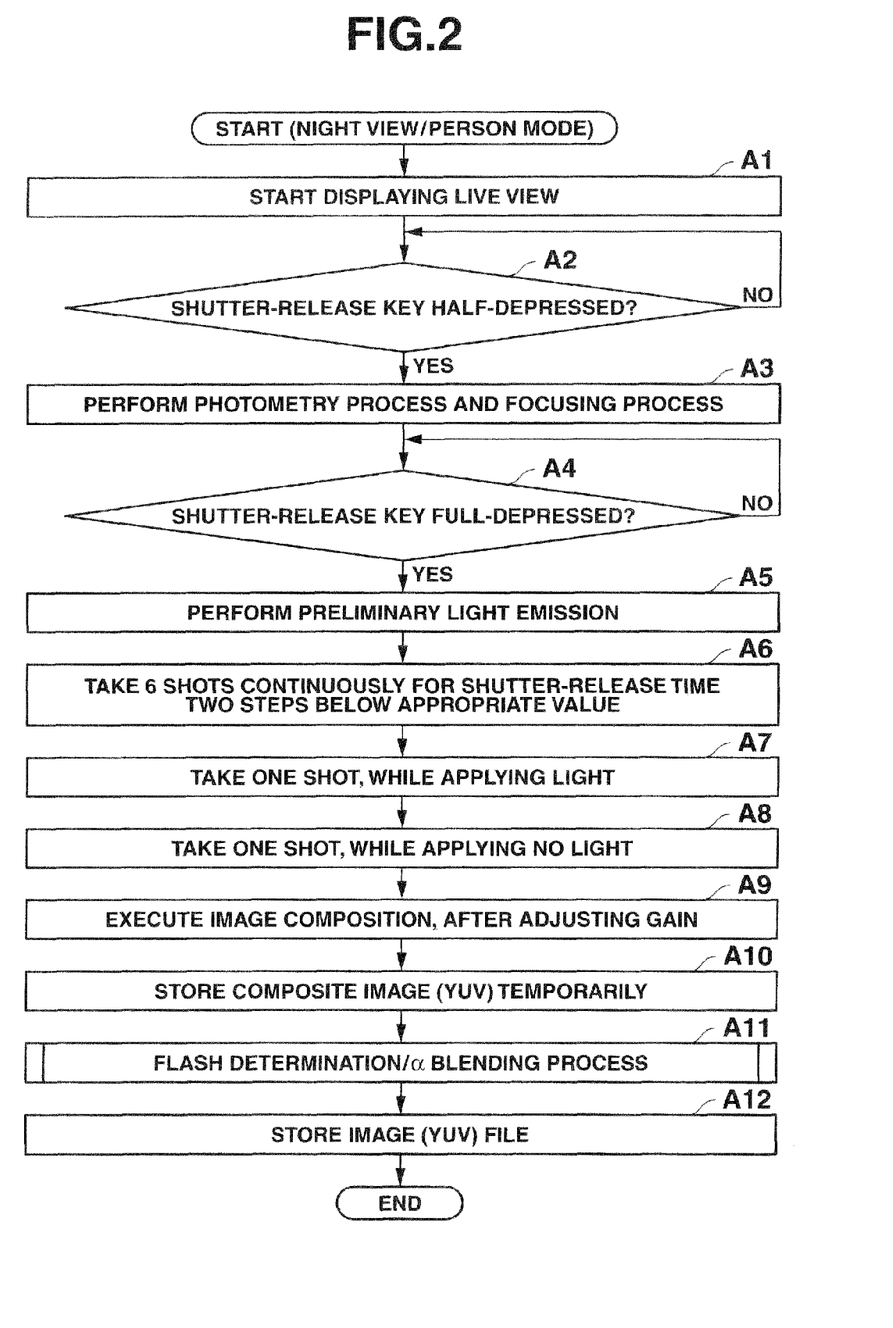
FIG. 2 is a flowchart showing the process sequence performed in the image pickup apparatus.

First, the control unit 9 causes the display unit 5 to display, as a live view, images continuously taken by the image pickup unit 1 (Step A1). Next, the control unit 9 determines whether the shutter-release key 41 has been half depressed (Step A2). If the shutter-release key 41 has been half depressed, the control unit 9 performs a photometry process and a focusing process, acquiring an appropriate exposure value and a focus position (Step A3). That is, in the photometry process at Step A3, an appropriate exposure value composed of a diaphragm opening and a shutter-release speed (equivalent to "shutter-lease time" and "exposure time," both described later) is calculated.

When the user depresses the shutter-release key 41 fully to take a picture, the decision at Step A4 is YES. As a result, the control unit 9 goes from Step A4 to Step A5. In Step A5, the control unit 9 causes the flash unit 12 to perform preliminary light emission. The preliminary light emission is performed in order to adjust the amount of light the flash unit 12 emits and to prevent the eyes of the person (main object) from appearing red. Note that the preliminary light emission is performed at least 0.8 seconds before the continuous shooting that uses flash light emission (Step A7, later described).

Subsequently, in order to avoid blurring of images due to hand movement, the control unit 9 causes the image pickup unit 1 to take six shots continuously, for shutter-release time (exposure time) two steps below the appropriate value (i.e., ¼ of the appropriate exposure time), without causing the flash unit 12 to emit light (Step A6).

Subsequently, the control unit 9 enables the flash unit 12 to emit light, causing the image pickup unit 1 to take one shot (Step A7). The one-shot photography is performed upon lapse of, for example, 0.1 seconds or more from Step A6, in order not to photograph the person while he or she is blinking. In Step A7, the shot is taken at ISO sensitivity lower than in Step A6.

Further, another shot is taken, without causing the flash unit 12 to emit light (Step S8). The image thus acquired is used as a reference flash-off image.

The photographic conditions (exposure, sensitivity, white balance, etc.) for Step A8 are identical to those for Step A7, except that the flash unit 12 emits no light at all).

Thus, image data representing the eight images (hereinafter referred to as "YUV image data") including six flash-off images acquired in Step A6, one flash-on image acquired in Step A7, and one reference flash-off image acquired in Step A8, is temporarily saved in the RAM 8.

The image data items representing the six flash-off images continuously taken in Step A6 are adjusted in terms of gain so that the flash-off images may have appropriate exposure values, and thereafter, an image composition of the six flash-off images are executed, thereby reducing the noise (Step A9).

The noise reduction is accomplished by executing an image composition, i.e., arithmetic adding and averaging process for each pixel of the YUV image data representing the continuously acquired images. A method for the noise reduction will be explained below.

For the arithmetic adding and averaging process for each pixel of the YUV image data representing the continuously acquired N images, the following equations (1) to (3) are provided:

$$Y\_result=(Y[0]+Y[1]+\ldots+Y[N])/N \quad (1)$$

$$U\_result=(U[0]+U[1]+\ldots+U[N])/N \quad (2)$$

$$V\_result=(V[0]+V[1]+\ldots+V[N])/N \quad (3)$$

where Y_result, U_result and V_result are data items, each obtained after composition of the luminance color-difference parameters of pixels.

The noise-reduced YUV image data as a composite image composed of the continuously acquired images is temporarily stored in the RAM 8 (Step A10).

Figure 4A:
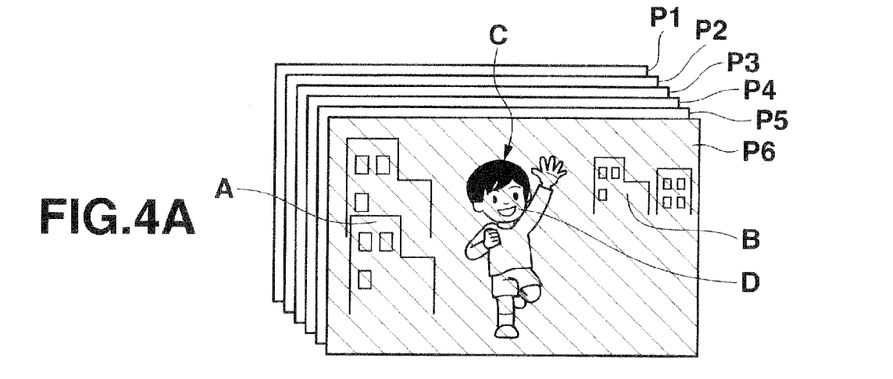
FIG. 4A is a diagram showing flash-off images acquired in the continuous shooting mode.

When Step A10 is completed, the RAM 8 stores YUV image data (see FIG. 4A) representing the six flash-off images P1 to P6, YUV image data (see FIG. 4B) representing one flash-on image P7, YUV image data representing one reference flash-off image P8, and YUV image data (see FIG. 4D) representing one composite image P9 composed of the six flash-off images P1 to P6.

Figure 4B:
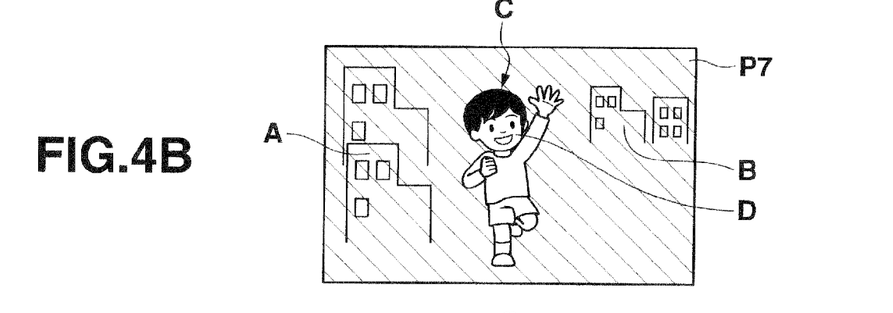
FIG. 4B is a diagram showing a flash-on image.
Figure 4C:
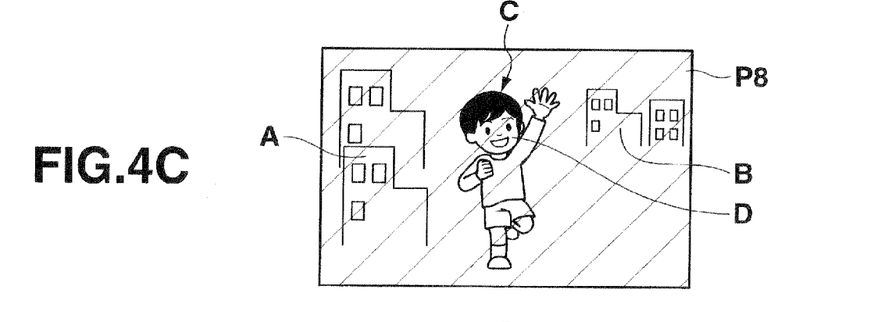
FIG. 4C is a diagram snowing a flash-off image used as reference.
Figure 4D:
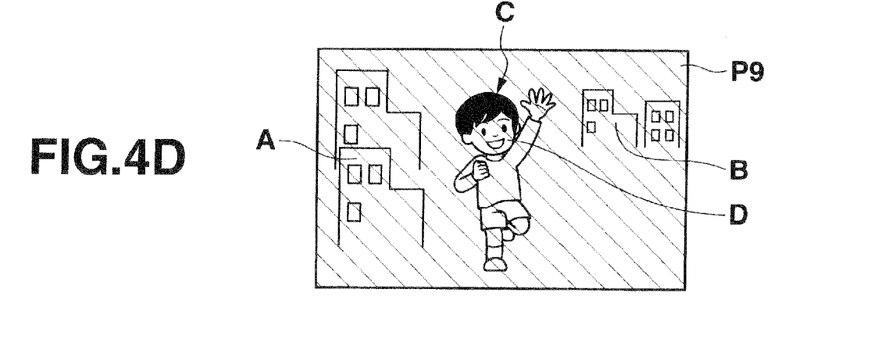
FIG. 4D is a diagram showing an image acquired by image composition of six flash-off images.

The flash-on image P9 is assumed to show only the main object C illuminated with the flash light, because the flash light does not reach the background object A or the background object B.

The YUV image data representing the flash-on image P7 and the composite image P9 composed of six flash-off images are processed to compose a composite image, in Step A11, i.e., flash determination/a blending process.

Figure 3:
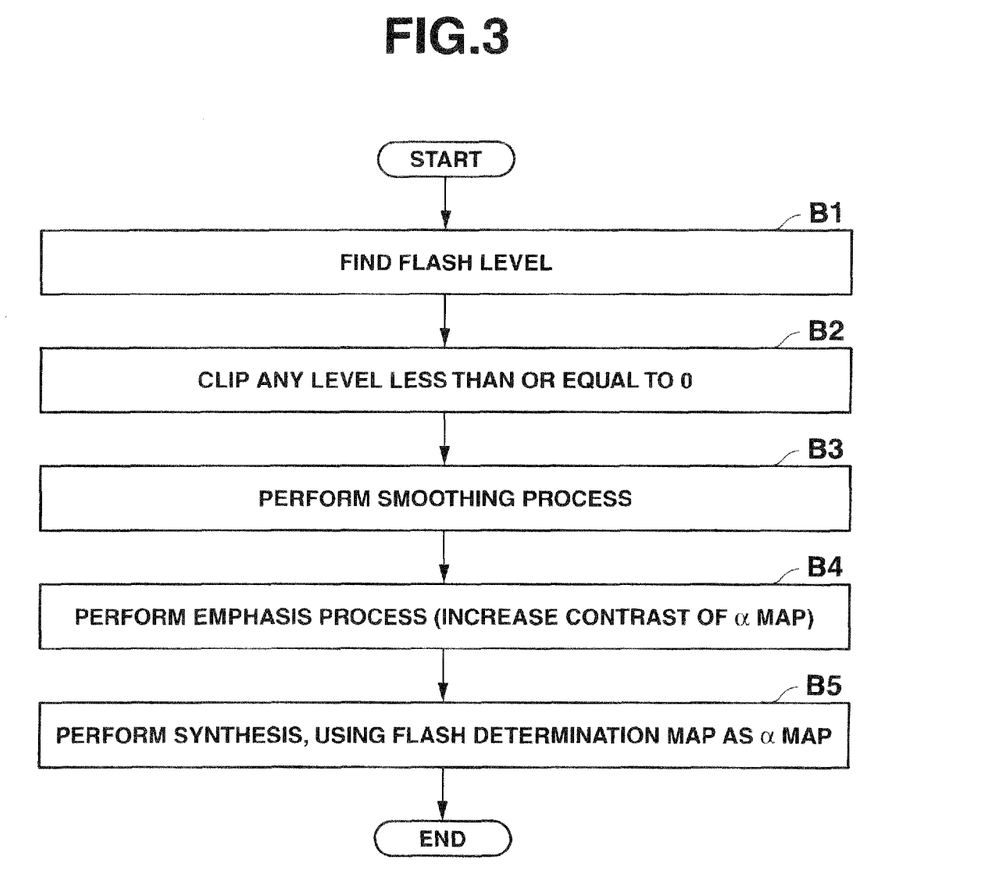
FIG. 3 is a flowchart showing the sequence of the flash determination/blending process performed in the image pickup apparatus.

FIG. 3 is a flowchart showing the sequence of the flash determination/a blending process performed in Step A11.

The flowchart of FIG. 3 will be explained, using equations, symbols and functions, all specified below.

Y_Flash_On: Y (luminance) parameter in the YUV image data representing the flash-on image P7

Y_Flash_Off_Judge: Y (luminance) parameter in the YUV image data representing the flash-off image P8 fLpf( ): Smoothing function (desirably, edge preservation type)

fEmphasis( ): Map emphasis function.

As shown in the flowchart of FIG. 3, the control unit 9 finds a flash level (Flash_Lev), using the following equation (4) (Step B1).

$$Flash\_Lev=(Y\_Flash\_On-Y\_Flash\_Off\_Judge) \quad (4)$$

That is, the difference in value Y between the YUV image data representing the flash-on image P7 and the YUV image data representing the reference flash-off image P8 is obtained for each pixel, and the difference is regarded as the flash level.

Next, of the flash levels (Flash_Lev) obtained in Step B1, any level less than or equal to 0 is clipped as expressed by the following equation (5) (Step B2):

$$Flash\_Lev=fMax(Flash\_Lev,0) \quad (5)$$

The process at Step B2 imparts only a positive value to the flash level (Flash_Lev) of each pixel.

Further, a smoothing process is performed as indicated by the following equation (6) (Step B3):

$$Flash\_Lev\_Lpf=fLpf\ Flash\_Lev) \quad (6)$$

The smoothing process is performed in Step B3 in order to reduce the influence of random noise and to smooth a flash determination map to make the image boundaries appear less unnatural in the composite image.

The filter used to smooth the flash determination map should better be a nonlinear filter such as filter or a bilateral filter generally called an "edge preservation type," rather than a simple low-pass filter (LPF).

Any filter of the edge preservation type can gently smoothen that part of the map, which has a small flash determination difference, and can least smoothen that part of the map, which has a large flash determination difference.

The use of the filter of the edge preservation type suppresses unnecessary color mixing at the flash determination boundaries in the composite image.

Figure 5A:
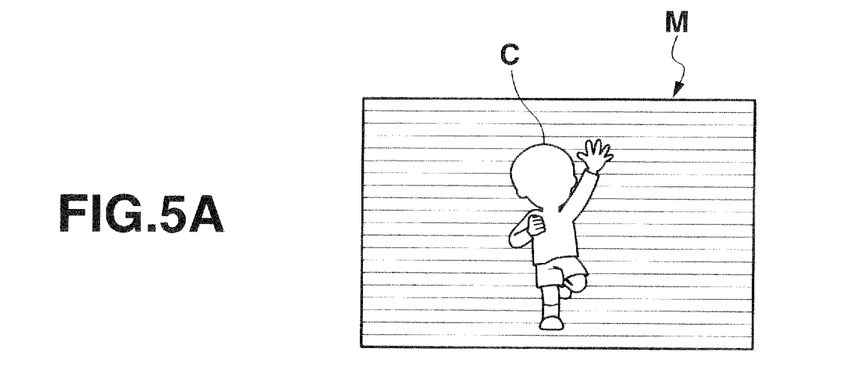
FIG. 5 is a diagram sowing the result of a smoothing process.

The smoothing process performed in Step B3 generates such a flash determination map M as shown in FIG. 5A.

Of the flash determination map M, the hatched part is a region where α=0, transmitting all light. The part, i.e., white part, is a region where α=255, transmitting no light at all.

Then, an emphasis process is performed as expressed by the following equation (7), thereby increasing the contrast of the flash determination map M (Step B4):

$$Map\_Flash=fEmphasis(Flash\_Lev\_Lpf) \quad (7)$$

The emphasis process performed in Step B4 aims at making any flash-determined region more distinguished from any region not flash determined.

Figure 5B:
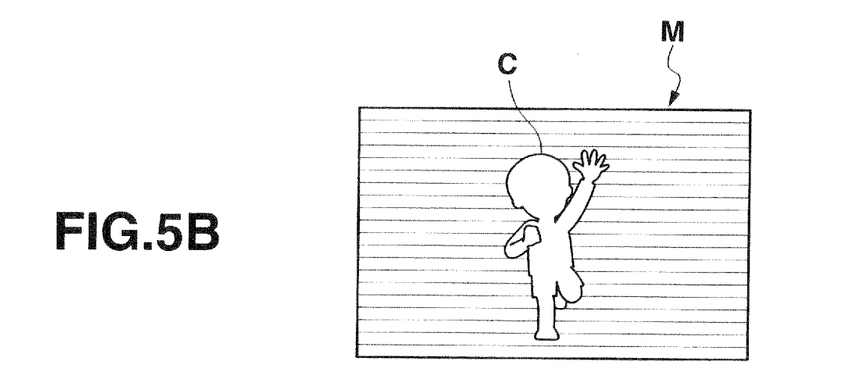
FIG. 5B is a diagram sowing the result of an emphasis process.

The emphasis process performed in Step B4 increases the contrast of the main-object region C in the flash termination map M, as is shown in FIG. 5B.

Using the flash determination map M as an α map, a composite image is finally composed from the YUV imager data (FIG. 4B) of one flash-on image P7 and the YUV image data representing one composite image P9 (FIG. 4D) composed of six flash-off images (Step B5).

The YUV parameter of the flash-on image P7 and the YUV parameter of the flash-off image P9 composed of six flash-off images are expressed by the following indications (8) and (9), respectively:

$$Y\_Flash\_On, U\_Flash\_On, V\_Flash\_On \quad (8)$$

$$Y\_Flash\_Off, U\_Flash\_Off, V\_Flash\_Off \quad (9)$$

Therefore, the composed YUV parameters (Y_result, U_result, V_result) of each pixel are expressed by the following equations (10), (11) and (12):

$$Y\_result=(Y\_Flash\_Off\times(255-Map\_Flash)+Y\_Flash\_On\times Map\_Flash)/255 \quad (10)$$

$$U\_result=(U\_Flash\_Off\times(255-Map\_Flash)+U\_Flash\_On\times Map\_Flash)/255 \quad (11)$$

$$V\_result=(V\_Flash\_Off\times(255-Map\_Flash)+V\_Flash\_On\times Map\_Flash)/255 \quad (12)$$

Figure 5C:
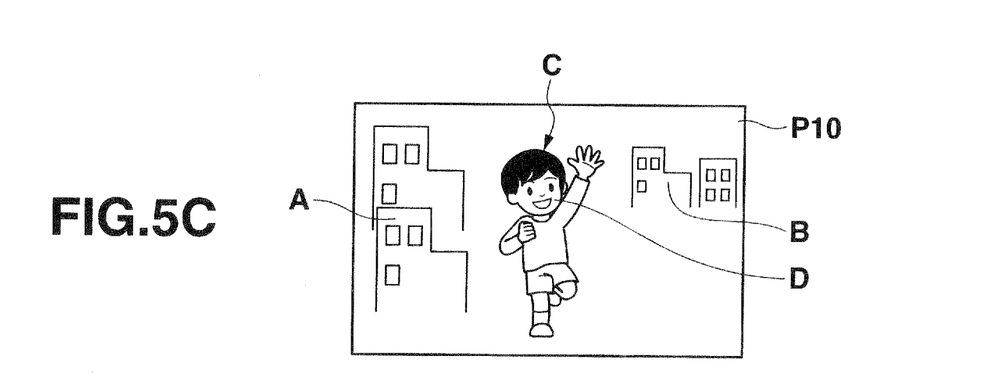
FIG. 5C shows a composite image according to the embodiment.

As a result, YUV image data is generated, which represents a composite image P10 showing the object C, i.e., person having face D, in a night view with background objects A and B, i.e., buildings, as shown in FIG. 5C.

The YUV image data representing the composite image P10 is thus generated, completing the flash determination/blending process (Step A11) shown in the flowchart of FIG. 12. Then, the YUV image data representing the final composite image PM is JPEG-encoded, providing an image file. The image file is stored in the image recording unit 6 (Step A12). The process sequence is then terminated.

This embodiment uses image data defined by the YUV color space. Nonetheless, image data expressed by the RGB color space may be used instead. Alternatively, image data expressed by any other color space may be used. (If image data expressed by the RGB color space is used, a square of difference will be calculated for the R, G and B parameters.)

In the embodiment, one flash-off image P8 is acquired and used as a reference image. Alternatively, one of the six flash-off images acquired in Step A6 may be used as a reference image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:
   an image pickup unit;
   a light emission unit;
   an image acquisition unit configured to drive the image pickup unit and the light emission unit to acquire images continuously under a first photographic condition while the light emission unit is emitting no light, to acquire an image under a second photographic condition that is different from the first photographic condition while the light emission unit is emitting light, and to acquire an image under the second photographic condition except for a condition of the light emission unit while the light emission unit is emitting no light, at substantially the same view angle;
   a difference acquisition unit configured to acquire a luminance difference between the image acquired while the light emission unit is emitting light and one of the images acquired while the light emission unit is emitting no light; and
   an image composing unit configured to compose a composite image from the images acquired while the light emission unit is emitting no light and the image acquired while the light emission unit is emitting light, by changing transmission for each pixel, using the luminance difference acquired by the difference acquisition unit as transmission intensity data for each pixel.

2. The image pickup apparatus according to claim 1, further comprising an emphasizing unit configured to emphasize the luminance difference acquired by the difference acquisition unit to increase contrast of the images,
   wherein the image composing unit composes the composite image from the images acquired while the light emission unit is emitting no light and the image acquired while the light emission unit is emitting light, using the luminance difference between the images having the contrast increased by the emphasizing unit as transmission intensity data.

3. The image pickup apparatus according to claim 1, further comprising a smoothing unit configured to smooth a luminance difference acquired by the difference acquisition unit,
   wherein the image composing unit composes the composite image from the images acquired while the light emission unit is emitting no light and the image acquired while the light emission unit is emitting light, using the luminance difference smoothed by the smoothing unit as transmission intensity data.

4. A image pickup method comprising:
   driving an image pickup unit and a light emission unit to acquire images continuously under a first photographic condition while the light emission unit is emitting no light, to acquire an image under a second photographic condition that is different from the first photographic condition while the light emission unit is emitting light, and to acquire an image under the second photographic condition except for a condition of the light emission unit while the light emission unit is emitting no light, at substantially the same view angle;
   acquiring a luminance difference between the image acquired while the light emission unit is emitting light and one of the images acquired while the light emission unit is emitting no light; and
   composing a composite image from the images acquired while the light emission unit is emitting no light and the image acquired while the light emission unit is emitting light, by changing transmission for each pixel, using the luminance difference acquired by the difference acquisition unit as transmission intensity data for each pixel.

5. A non-transitory computer-readable storage medium having a program stored thereon for controlling a computer in an image pickup apparatus that includes an image pickup unit and a light emission unit, to perform functions comprising:
   driving the image pickup unit and the light emission unit to acquire images continuously under a first photographic condition while the light emission unit is emitting no light, to acquire an image under a second photographic condition that is different from the first photographic condition while the light emission unit is emitting light, and to acquire an image under the second photographic condition except for a condition of the light emission unit while the light emission unit is emitting no light, at substantially the same view angle;
   acquiring a luminance difference between the image acquired while the light emission unit is emitting light and one of the images acquired while the light emission unit is emitting no light; and
   composing a composite image from the images acquired while the light emission unit is emitting no light and the image acquired while the light emission unit is emitting light, by changing transmission for each pixel, using the luminance difference acquired by the difference acquisition unit as transmission intensity data for each pixel.

* * * * *